United States Patent [19]

Barrett et al.

[11] Patent Number: 5,371,823
[45] Date of Patent: Dec. 6, 1994

[54] COMPOSITE CABLE INCLUDING A LIGHT WAVEGUIDE CABLE AND A COAXIAL CABLE

[75] Inventors: Michael J. Barrett, Hickory; Stephen T. Ferguson, Morganton, both of N.C.

[73] Assignee: Siecor Corporation, Hickory, N.C.

[21] Appl. No.: 205,446

[22] Filed: Mar. 4, 1994

[51] Int. Cl.⁵ .............................................. G02B 6/44
[52] U.S. Cl. .................... 385/101; 174/70 R; 385/100
[58] Field of Search ............... 174/70 R; 385/100–114

[56] References Cited

U.S. PATENT DOCUMENTS

| | | | |
|---|---|---|---|
| 4,423,306 | 12/1983 | Fox | 174/115 X |
| 4,468,089 | 8/1984 | Brorein | 385/101 X |
| 4,665,280 | 5/1987 | Bowen | 174/71 R |
| 4,761,053 | 8/1988 | Cogelia et al. | 385/102 X |
| 4,763,983 | 8/1988 | Keith | 385/102 |
| 4,801,764 | 1/1989 | Ohlhaber | 385/114 X |
| 4,852,965 | 8/1989 | Mullin et al. | 385/101 |
| 4,856,867 | 8/1989 | Gaylin | 385/102 X |
| 4,952,020 | 8/1990 | Huber | 385/114 |
| 5,113,036 | 5/1992 | Arroyo et al. | 385/100 |
| 5,189,718 | 2/1993 | Barrett et al. | 385/101 |
| 5,245,134 | 9/1993 | Vana, Jr. et al. | 385/112 X |

Primary Examiner—John D. Lee
Attorney, Agent, or Firm—J. David Abernethy

[57] ABSTRACT

A metallic current-carrying coaxial cable is connected by a plastic web to a cable holding light waveguides.

8 Claims, 1 Drawing Sheet

COMPOSITE CABLE INCLUDING A LIGHT WAVEGUIDE CABLE AND A COAXIAL CABLE

BACKGROUND OF THE DISCLOSURE

The field of the invention is cables having both light waveguides and a current carrying conductor, sometimes called composite cables.

It is sometimes desirable to provide cables holding both light waveguides for transmitting light and other communication elements for transmitting electricity.

Barrett et al., U.S. Pat. No. 5,189,718, disclose a "dumbbell" type cable in which one side of the dumbbell is a light waveguide cable and the other side is a cable holding a plurality of current carrying conductors. While such cable is useful for the transmission of messages over the plurality of metallic conductors, it is not designed for the transmission of power. Power transmission is usually in the form of a coaxial cable.

The prior art has not provided a dumbbell shaped cable having both a light waveguide cable and a traditional type coaxial cable.

SUMMARY OF THE INVENTION

The present invention provides a first tube contorting a single coaxial current-carrying electrical conductor, with no other electrical conductors; a second tube containing a plurality of light waveguides; and, a web extending between the first and second tubes, said web having a thickness narrower than half the outer diameter of the first tube or the second tube. The second tube may contain one or more strength members and be dielectric. A tubular metallic shield may be disposed between the coaxial current carrying electrical conductor and the first tube. The invention is particularly well suited for cable television network applications.

BRIEF DESCRIPTION OF THE DRAWINGS

The detailed description is made with reference to the single drawing FIG. 1, which is a sectional view of the cable according to the invention.

DETAILED DESCRIPTION OF THE PREFERRED EMBODIMENT

Figure 1:
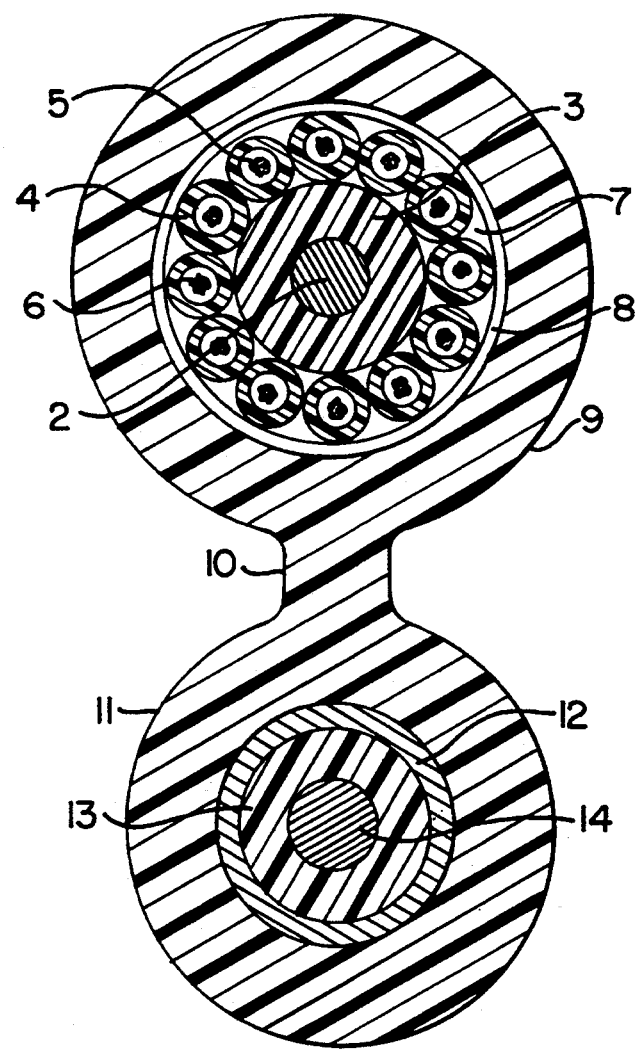

The preferred embodiment according to the invention is as shown in FIG. 1. First tube 11, web 10, and second tube 9 comprise a plastic material, preferably polyethylene. The thickness of web 10 is less than one-half the outer diameter of either tube 11 or tube 9.

First tube 11 forms the outer jacket of a coaxial cable. Disposed in tube 11 is a core single current-carrying electrical conductor 14, which may be copper coated steel; insulation 13, which may be a gas expanded plastic; and metal tape 12, which acts as a tubular metallic shield to protect conductor 14 from the effects of currents induced by external fields.

Second tube 9 forms the outer jacket of a light waveguide cable. The light waveguide cable has a central tensile strength member 2, which may be metallic such as steel or dielectric such as a glass reinforced plastic rod; a plastic tube 3 coated thereover; and an array of buffer tubes 4 stranded or laid straight thereover, each loosely holding a bundle of light waveguides 6. Each buffer tube 4 may optionally hold a filling compound 5 and may optionally be surrounded by a flooding compound 7. A binder tape 8 may be wrapped over tubes 4. If desired, filling compound 5 and flooding compound may be omitted, and replaced by a waterblocking tape used as binder tape 8.

If desired, other light waveguide cable designs may be utilized, such as slotted core, ribbon, core tube, or slotted core ribbon designs, as the light waveguide cable portion of the invention.

What is claimed is:

1. A communications cable, comprising:
    a first tube containing a single coaxial current-carrying electrical conductor and no other electrical conductors;
    a second tube containing a plurality of light waveguides and at least one strength member; and,
    a web extending between the first and second tubes, said web having a thickness narrower than half the outer diameter of the first tube or the second tube.

2. A cable as recited in claim 1 wherein the second tube and its contents are dielectric.

3. A cable as recited in claim 1 further comprising a waterblocking tape contained in the second tube.

4. A communications cable, comprising:
    a first tube containing a single coaxial current-carrying electrical conductor and no other electrical conductors, and a tubular metallic shield disposed between the electrical conductor and the first tube;
    a second tube containing a plurality of light waveguides; and,
    a web extending between the first and second tubes, said web having a thickness narrower than half the outer diameter of the first tube or the second tube.

5. A cable as recited in claim 4 further comprising a waterblocking tape held in the second tube.

6. A cable as recited in claim 4, wherein the second tube and its contents are dielectric.

7. A cable as recited in claim 6, further comprising at least one strength member contained in the second tube.

8. A cable as recited in claim 7 wherein the second tube and its contents are dielectric.

* * * * *